(12) United States Patent
Malarkey et al.

(10) Patent No.: US 11,220,021 B2
(45) Date of Patent: Jan. 11, 2022

(54) APPARATUS AND METHODS OF CERAMIC PRE-CURSOR BATCH RHEOLOGY CONTROL

(71) Applicant: Corning Incorporated, Corning, NY (US)

(72) Inventors: Christopher John Malarkey, Corning, NY (US); Conor James Walsh, Campbell, NY (US)

(73) Assignee: Corning Incorporated, Corning, NY (US)

( * ) Notice: Subject to any disclaimer, the term of this patent is extended or adjusted under 35 U.S.C. 154(b) by 366 days.

(21) Appl. No.: 16/321,882

(22) PCT Filed: Aug. 3, 2017

(86) PCT No.: PCT/US2017/045251
§ 371 (c)(1),
(2) Date: Jan. 30, 2019

(87) PCT Pub. No.: WO2018/027006
PCT Pub. Date: Feb. 8, 2018

(65) Prior Publication Data
US 2019/0176362 A1    Jun. 13, 2019

Related U.S. Application Data

(60) Provisional application No. 62/370,518, filed on Aug. 3, 2016.

(51) Int. Cl.
*B28B 17/00* (2006.01)
*B28B 3/20* (2006.01)
(Continued)

(52) U.S. Cl.
CPC ........... *B28B 17/0072* (2013.01); *B01J 35/04* (2013.01); *B28B 3/20* (2013.01); *B28B 3/224* (2013.01);
(Continued)

(58) Field of Classification Search
CPC ... B28B 17/0072; B28B 17/0081; B28B 3/20; B28B 2003/203; B29C 48/29; B29C 48/92
See application file for complete search history.

(56) References Cited

U.S. PATENT DOCUMENTS 4,436,679 A    3/1984    Winstead
4,657,499 A    4/1987    Lewellen et al.
(Continued)

FOREIGN PATENT DOCUMENTS

CN    103338905 A    10/2013
CN    104290175 A    1/2015
(Continued)

OTHER PUBLICATIONS

Gale; "Mixing of Solid and Liquid Additives Into Polymers Using Single Screw Extruders" Antec, 1991 pp. 95-98.
(Continued)

*Primary Examiner* — Jacob T Minskey
*Assistant Examiner* — Virak Nguon
(74) *Attorney, Agent, or Firm* — Kurt R. Denniston

(57) ABSTRACT

A system (100) and method to control rheology of ceramic pre-cursor batch during extrusion is described herein. An extrusion system (100) comprises an extruder (122) with an input port (144) configured to feed ceramic pre-cursor batch into a first section (120) of an extruder barrel and a discharge port configured to extrude a ceramic pre-cursor extrudate (172) out of the extruder barrel downstream of the input port (144). A liquid injector (210) is configured to inject liquid
(Continued)

into the ceramic pre-cursor batch. A sensor (106) is configured to detect a rheology characteristic of the ceramic pre-cursor batch. A controller (108) is configured (i) to receive the rheology characteristic from the sensor (106), (ii) compare the rheology characteristic to a predetermined rheology value of the ceramic pre-cursor batch, and (iii) generate a command based on the comparison. A liquid regulator (110) is configured to receive the command and adjust liquid flow to the liquid injector (210) based on the command.

20 Claims, 7 Drawing Sheets

(51) Int. Cl.
  *B28B 3/22* (2006.01)
  *B30B 11/00* (2006.01)
  *B30B 11/24* (2006.01)
  *B29C 48/29* (2019.01)
  *B29C 48/11* (2019.01)
  *B29C 48/92* (2019.01)
  *B29C 48/00* (2019.01)
  *B01J 35/04* (2006.01)
  *B28B 3/26* (2006.01)

(52) U.S. Cl.
  CPC .......... *B28B 3/269* (2013.01); *B28B 17/0081* (2013.01); *B29C 48/022* (2019.02); *B29C 48/11* (2019.02); *B29C 48/29* (2019.02); *B29C 48/92* (2019.02); *B30B 11/005* (2013.01); *B30B 11/24* (2013.01); *B28B 2003/203* (2013.01); *B29C 2948/922* (2019.02); *B29C 2948/92104* (2019.02)

(56) References Cited

U.S. PATENT DOCUMENTS

| | | | |
|---|---|---|---|
| 5,236,645 | A | 8/1993 | Jones |
| 5,531,923 | A | 7/1996 | Le Blanc et al. |
| 6,405,579 | B1 | 6/2002 | Tjahjadi et al. |
| 2003/0098530 | A1* | 5/2003 | Inoguchi ............... B28B 3/20 264/630 |
| 2005/0046072 | A1 | 3/2005 | Shalkey |
| 2005/0213423 | A1* | 9/2005 | Ferencz ............... B29C 48/832 366/76.2 |
| 2008/0025139 | A1 | 1/2008 | Ferencz et al. |
| 2010/0300183 | A1 | 12/2010 | Dasher et al. |
| 2011/0006461 | A1 | 1/2011 | Dasher et al. |
| 2011/0121477 | A1* | 5/2011 | Qiu ............... B30B 15/308 264/40.7 |
| 2012/0133065 | A1* | 5/2012 | Caffrey ............... B28B 3/20 264/40.1 |
| 2014/0345153 | A1 | 11/2014 | Pahwa et al. |
| 2015/0086670 | A1 | 3/2015 | Kitamura et al. |

FOREIGN PATENT DOCUMENTS

| | | |
|---|---|---|
| CN | 104364062 A | 2/2015 |
| CN | 104441209 A | 3/2015 |
| DE | 4445203 C1 | 2/1996 |
| EP | 3075718 A1 | 10/2016 |
| JP | H 0911216 A * | 6/1995 |
| JP | 911216 A | 1/1997 |
| JP | 2003-516880 A | 5/2003 |
| JP | 2011-513093 A | 4/2011 |
| JP | 2013-545641 A | 12/2013 |
| JP | 2014208445 A | 11/2014 |
| JP | 2016-511937 A | 4/2016 |
| WO | 2012/074946 A1 | 6/2012 |

OTHER PUBLICATIONS

Haberstroh et al; "Continuous Liquid Incorporation in the Transfermix Extruder" [Kontinuierliche Fluessigkeitseindosierung Im Transfermixextruder] 1999 KGK-Kautschuk und Gummi Kunststoffe 52 (2), pp. 114-119.

Harrington; "Designing an Extruder Additive Injection Valve"; 1997 Annual Technical Conference—Antec, Conference Proceedings 1 , pp. 285-289.

International Search Report and Written Opinion of the International Searching Authority; PCT/US2017/045251; dated Nov. 9, 2017; 27 Pages; European Patent Office.

Meitner et al; "Development of a Twin-Screw D2 Extruder for The ITER Pellet Injection System" ; 2009 Fusion Science and Technology 66 (1), pp. 52-56.

Meitner et al; "Twin-Screw Extruder Development OFR the ITER Pellet Injection System" ; (2009); Proceedings—Symposium on Fusion Engineering, Art. No. 5226408; 4 Pages.

Picard et al; "Structural Foam Processing Enhanced With Liquid Foaming Agents and Metering Injector System" ; Plastic Design & Processing, 15 (9), (1975) pp. 15-17.

Xu; "Velocity Analysis in Recovery Process for Reciprocating-Screw of Injection Molding"; 2004 Annual Technical Conference—ANTEC, Conference Proceedings 1 , pp. 594-598.

English Translation of CN201780049011.0 Office Action dated May 19, 2020; 31 Pages; Chinese Patent Office.

Chinese Patent Application No. 201780049011.0, Office Action dated Mar. 1, 2021, 29 pages (English Translation Only); Chinese Patent Office.

Japanese Patent Application No. 2019-505488, Office Action dated Aug. 30, 2021, 6 pages (3 pages of English Translation and 3 pages of Original Document), Japanese Patent Office.

\* cited by examiner

APPARATUS AND METHODS OF CERAMIC PRE-CURSOR BATCH RHEOLOGY CONTROL

CROSS-REFERENCE TO RELATED APPLICATIONS

This application is a National Stage application under 35 U.S.C. § 371 of International Application No. PCT/US2017/045251, filed on Aug. 3, 2017, which claims the benefit of priority to U.S. Provisional Application Ser. No. 62/370,518, filed on Aug. 3, 2016, the contents of which are incorporated herein by reference in their entireties.

This application claims the benefit of priority under 35 U.S.C. § 119 of U.S. Provisional Application Ser. No. 62/370,518, filed on Aug. 3, 2016, the content of which is relied upon and incorporated herein by reference in its entirety.

FIELD

Exemplary embodiments of the present disclosure relate to apparatus and methods of ceramic pre-cursor batch rheology control, more particularly, to apparatus and methods of ceramic pre-cursor batch rheology control in extrusion manufacturing ceramic honeycomb bodies.

BACKGROUND

After-treatment of exhaust gas from internal combustion engines may use catalysts supported on high-surface area substrates and, in the case of diesel engines and some gasoline direct injection engines, a catalyzed filter for the removal of carbon soot particles. Porous ceramic flow-through honeycomb substrates and wall-flow honeycomb filters may be used in these applications.

The manufacture of ceramic honeycomb structures may be accomplished by the process of plasticizing ceramic powder batch mixtures, extruding the mixtures through honeycomb extrusion dies to form honeycomb extrudate, and drying and firing the extrudate to produce ceramic honeycombs of high strength and thermal durability. The ceramic honeycombs thus produced are widely used as ceramic catalyst supports in motor vehicle exhaust systems, and as catalyst supports and wall-flow particulate filters for the removal of soot and other particulates from diesel engine exhausts.

The above information disclosed in this Background section is only for enhancement of understanding of the background of the disclosure and therefore it may contain information that does not form any part of the prior art nor what the prior art may suggest to a person of ordinary skill in the art.

SUMMARY

Exemplary embodiments of the present disclosure provide an extrusion system for ceramic pre-cursor batch.

Exemplary embodiments of the present disclosure also provide a batch rheology control system for an extruder.

Exemplary embodiments of the present disclosure also provide a method of manufacturing a ceramic pre-cursor extrudate.

Exemplary embodiments of the present disclosure also provide a method of manufacturing a ceramic pre-cursor honeycomb body using ceramic pre-cursor batch rheology control in an extruder.

Exemplary embodiments of the present disclosure are directed to an extrusion system that comprises an extruder. The extruder comprises an input port configured to feed ceramic pre-cursor batch into a first section of an extruder barrel, and a discharge port configured to extrude a ceramic pre-cursor extrudate out of the extruder barrel downstream of the input port. The system also comprises a liquid injector configured to inject liquid into the ceramic pre-cursor batch; a sensor configured to detect a rheology characteristic of the ceramic pre-cursor batch; and a controller configured (i) to receive the rheology characteristic from the sensor, (ii) compare the rheology characteristic to a predetermined rheology value of the ceramic pre-cursor batch, and (iii) generate a command based on the comparison. The system further comprises a liquid regulator configured to receive the command and adjust liquid flow to the liquid injector based on the command.

In some embodiments, the rheology characteristic comprises at least one of (i) a liquid content of the ceramic pre-cursor batch, (ii) a stiffness of the ceramic pre-cursor batch, (iii) a wall drag of the ceramic pre-cursor batch, (iv) a die pressure, (v) a barrel pressure, (vi) a pressure change at a mixing plate, (vii) an extrusion torque, (viii) a ceramic pre-cursor batch temperature, and (ix) a screen pressure.

In some embodiments, the predetermined rheology value comprises (i) a first liquid value for extruder die start-up conditions and (ii) a second liquid value less than the first value for steady-state extruder conditions.

In some embodiments, the liquid injector is configured to inject liquid into the ceramic pre-cursor batch upstream of the first section of the extruder barrel.

In some embodiments, the liquid injector is configured to inject liquid into the ceramic pre-cursor batch in a second section of the extruder barrel downstream of the first section of the extruder barrel and upstream of the discharge port of the extruder barrel.

In some embodiments, the liquid injector is configured to inject liquid into the extruder barrel at a pressure of 0.5 psi to 3000 psi.

In some embodiments, the liquid injector is configured to inject liquid into the extruder barrel at a pressure of 0.5 psi to 10 psi.

In some embodiments, the liquid injector is configured to inject liquid into the extruder barrel through a liquid injection port.

In some embodiments, the sensor is configured to detect the liquid content in the ceramic pre-cursor batch upstream of the input port.

In some embodiments, the sensor is configured to detect the liquid content in the ceramic pre-cursor batch downstream of the discharge port.

In some embodiments, the sensor is configured to detect at least one of oil-based fluid content and water-based fluid content as the liquid content in the ceramic pre-cursor batch.

In some embodiments, the sensor comprises at least one of (i) a near infrared (IR) sensor and (ii) a microwave sensor.

In some embodiments, a die is coupled to the discharge port and the die comprises a die body; feed holes configured to accept the ceramic pre-cursor batch at the upstream surface, wherein the feedholes are disposed in an upstream surface of the die body and extend downstream into the die body; and exit slots configured to shape the ceramic pre-cursor batch into a honeycomb extrudate, wherein the exits slots are arranged in a matrix pattern intersecting the feedholes in the die body and extend to a discharge surface of the die.

In some embodiments, the controller is configured to (i) generate the command with an increase liquid flow value, when the rheology characteristic is less than the predetermined rheology value, and (ii) generate the command with a decrease liquid flow value, when the rheology characteristic is more than the predetermined rheology value.

In some embodiments, the liquid regulator is configured to adjust more liquid flow to the liquid injector in response to receipt of the command with the increase liquid flow value, and the liquid regulator is configured to adjust less liquid flow to the liquid injector in response to receipt of the command with the decrease liquid flow value.

In some embodiments, the system comprises a vacuum device configured to evacuate gas from the ceramic pre-cursor batch in a third section of the extruder barrel downstream of the input port, downstream of the liquid injector, and upstream of the discharge port.

Exemplary embodiments of the present disclosure are directed to a method of manufacturing a ceramic pre-cursor extrudate. The method comprises disposing a ceramic pre-cursor batch into a first section of an extruder barrel; injecting liquid into the ceramic pre-cursor batch; extruding a ceramic pre-cursor extrudate out of the extruder barrel downstream of the disposing and the injecting; detecting a rheology characteristic of the ceramic pre-cursor batch; comparing the rheology characteristic to a predetermined rheology value of the ceramic pre-cursor batch; and adjusting injecting liquid into the ceramic pre-cursor batch based on the comparing.

In some embodiments, the predetermined rheology value comprises (i) a first liquid value for extruder die start-up conditions and (ii) a second liquid value less than the first value for steady-state extruder conditions.

In some embodiments, the predetermined rheology value is at least one of (i) a die pressure, (ii) a barrel pressure, (iii) a pressure change at the mixing plate, (iv) a screen pressure, and (v) a ceramic pre-cursor batch temperature.

In some embodiments, the injecting is upstream of the first section.

In some embodiments, the injecting is in a second section of the extruder barrel downstream of the first section.

In some embodiments, the injecting is at a pressure of 0.5 psi to 3000 psi.

In some embodiments, the detecting comprises detecting the rheology characteristic in the ceramic pre-cursor batch upstream of the injecting.

In some embodiments, the detecting comprises detecting the rheology characteristic in the ceramic pre-cursor batch downstream of the extruding.

In some embodiments, the extruding comprises forming a honeycomb extrudate.

It is to be understood that both the foregoing general description and the following detailed description are exemplary and explanatory and are intended to provide further explanation of the disclosure. Additional features of the disclosure will be set forth in the description which follows, and in part will be apparent from the description, or may be learned by practice of the disclosure.

BRIEF DESCRIPTION OF THE FIGURES

The accompanying drawings, which are included to provide a further understanding of the disclosure and are incorporated in and constitute a part of this specification, illustrate exemplary embodiments of the disclosure, and together with the description serve to explain the principles of the disclosure.

DETAILED DESCRIPTION

Figure 1:
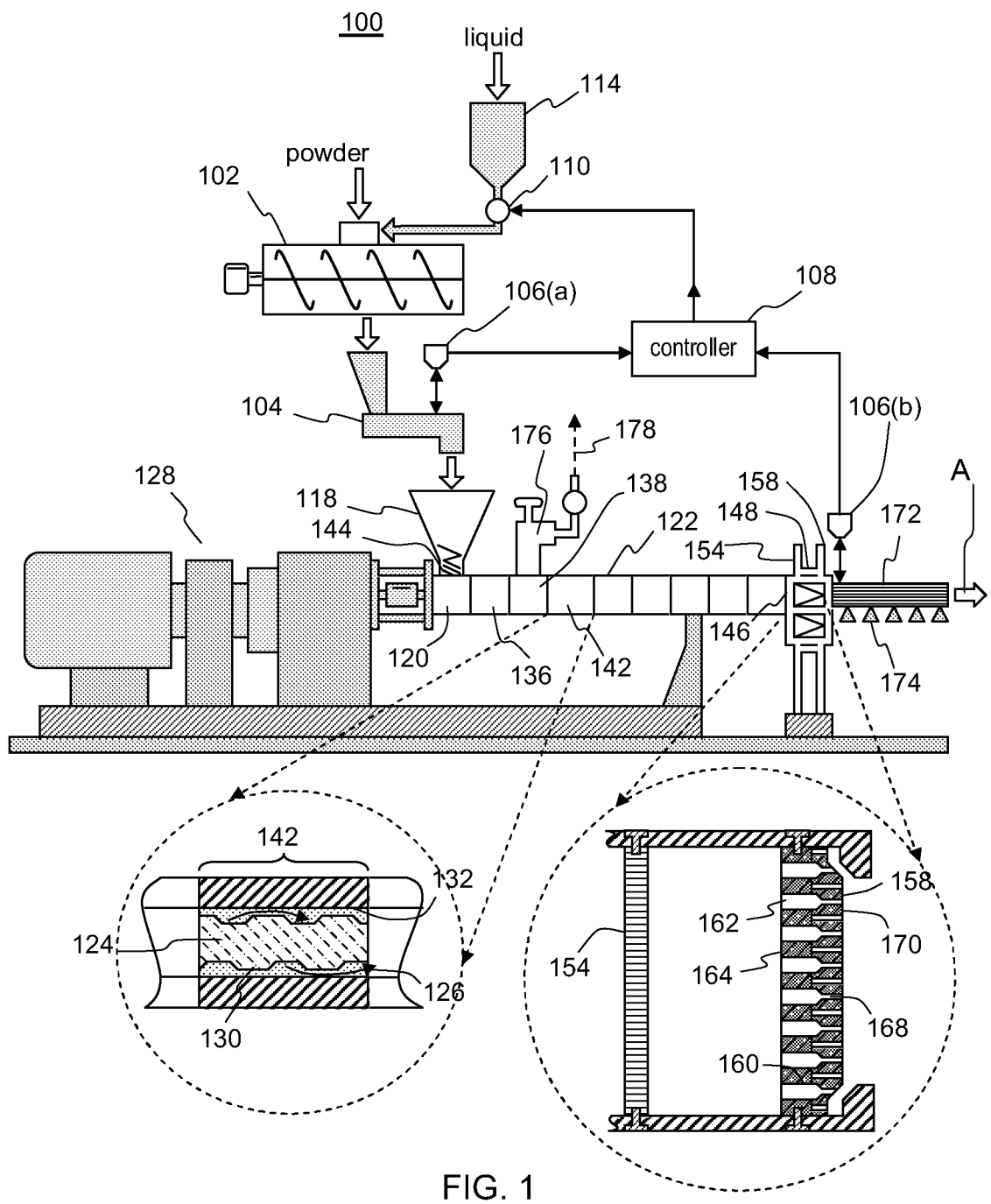
FIG. 1 shows a schematic of a screw extruder, such as a twin screw extruder, and upstream processing of batch components for extrudate such as honeycomb extrudate for ceramic honeycomb bodies for catalytic converter substrates and/or filters, according to exemplary embodiments of the disclosure.

The manufacture of porous ceramic honeycomb bodies may be accomplished by the process of plasticizing ceramic powder batch mixtures, extruding the mixtures through honeycomb extrusion dies to form honeycomb extrudate, and cutting, drying, and firing the extrudate to produce ceramic honeycomb bodies of high strength and thermal durability having channels extending axially from a first end face to a second end face. As referred to herein, batch, ceramic powder batch mixtures, ceramic pre-cursor batches, and ceramic batch compositions may comprise inorganic oxides or oxide precursors that when reacted form a ceramic, as well as ceramics that remain unreacted or react to form another ceramic in whole or in part. As used herein, a ceramic honeycomb body includes ceramic honeycomb monoliths and ceramic segmented honeycomb bodies.

Among the commercially successful processes for ceramic honeycomb manufacture are those that utilize large co-rotating twin screw extruders for the mixing and extruding of ceramic honeycomb extrudate. These machines offer the capability of homogenizing and plasticizing ceramic powder batch mixtures and pressure-forcing the mixtures through honeycomb extrusion dies, such as in a single continuous processing operation. The favorable economics of this approach extend from the high-volume production of honeycombs of relatively small diameter for automobile exhaust systems to the shaping of very large frontal area (VLFA) honeycombs for large diesel engine exhaust systems. Cylindrical honeycomb shapes having cross-sectional diameters measured transversely to the cylinder axis and direction of honeycomb channel orientation can range from as small as 5 cm up to 50 cm or more.

The rotating screws used in extruders commonly comprise a plurality of screw segments that are successively positioned, such as on a splined or keyed axial drive shaft, to form the entire screw. Screw segments may be made of any suitable material, such as metal or ceramic. Ram extrusion, pressing, casting, spraying, and 3-dimensional printing are other processes for ceramic honeycomb manufacture.

A co-extruded or an after-applied exterior skin may form an outer axial peripheral surface of the ceramic honeycomb bodies. Each channel of the honeycomb bodies, whether monolithic or segmented, can be plugged at an inlet face or an outlet face to produce a filter. When some channels are left unplugged a partial filter can be produced. The honeycomb body, whether monolithic or segmented, can be catalyzed to produce a substrate. Further, filters and partial filters can be catalyzed to provide multi-functionality. The ceramic honeycomb bodies thus produced are widely used as ceramic catalyst supports in motor vehicle exhaust systems, and as catalyst supports and wall-flow particulate filters for the removal of soot and other particulates from engine exhausts.

Extrusion manufacturing of thin wall cellular substrates can include excessive periods of operation with low production yields while die pressure stabilizes to a steady state running pressure. For example, two specific cases where production losses can be incurred are starting up new clean dies and starting up clean dies.

Several techniques have been developed to address these low production problems. Varying feed rate to low levels (which can be inefficient), varying water content in the batch, and pre-lubricating the die with oil (e.g., polyalphaolefin (PAO) such as DURASYN® 162 and 164) have been used to help address the problem. Varying water content in the batch may create additional problems, such as defects in extrudate and variable extrusion pressure. Another technique utilizes the rheological properties of the batch to achieve a steady state pressure in the most effective manner.

Exemplary embodiments of the disclosure address the problem of excessive periods of operation with low production yields while die pressure stabilizes to a steady state running pressure, and exemplary embodiments of the disclosure also address the problem of variable water content in the batch. According to exemplary embodiments of the disclosure, a constant water content in the batch in the extruder improves extrusion stability and reduces defects in the extrudate, while increasing water in batch in the extruder during die startups, achieves a steady state pressure in the most effective manner without having to waste a significant amount of the batch during die startups.

Some exemplary embodiments of the disclosure provide a control process whereby a high pressure liquid injection port is used in conjunction with an NIR meter for closed loop control to quickly introduce and vary precise amounts of batch water and/or other liquids, such that die startup time and liquid content variability, which causes forming process variability, can be reduced.

Some exemplary embodiments of the disclosure provide an apparatus to extrude honeycomb bodies and a method of extruding honeycomb bodies. According to these exemplary embodiments, an apparatus and method are provided that include an injection port on an extruder, such as a twin screw extruder, a high pressure metering pump, and a Near-Infrared (NIR) sensor to measure water content in the batch.

A real time feedback control system of the apparatus and method uses the NIR or like system to determine the amount of liquids in the batch on a continuous basis and output a result of the determination. The result of the determination of the amount of liquid in the batch is used to control the metering pump to adjust the liquids to a predetermined set point depending on whether start-up or steady state conditions are transpiring.

FIG. 1 presents a schematic diagram of a screw extruder, such as a twin screw extruder, and upstream processing of batch components for extrudate, such as honeycomb extrudate for ceramic honeycomb bodies for catalytic converter substrates and/or filters. Upstream refers to away from a point, for example, the extrusion die, in a direction opposite the direction of batch material flow during extrusion. Upstream also refers to processes and apparatus that feed into the extruder in a process stream. Conversely, downstream refers to a direction the same as the direction of batch material flow. Downstream also refers to processes and apparatus after the extruder in the process stream.

The extruder and upstream processing system 100 illustrated in FIG. 1 includes a preconditioner 102 to mix dry and wet ingredients and a metering pre-mix 104 to feed the preconditioned batch downstream. One or more sensors 106(*a*), 106(*b*) can be used to detect a rheology characteristic of the batch (e.g., (i) water content of the batch (moisture), (ii) oil (lubricant) content of the batch, (iii) shape of the extrudate, (iv) extrusion torque, (v) temperature of batch in the extruder, and (vi) pressure of the batch in the extruder). The sensor 106(*a*), 106(*b*) and/or a controller can generate other rheology characteristics from the detected rheology characteristics. For example, stiffness of the batch and wall drag of the batch in the extruder can be derived from pressure measurement performed by one or more pressure sensors. Accordingly, stiffness and wall drag may also be rheology characteristics.

In some embodiments, the sensor 106(*a*), 106(*b*) a near infrared (NIR) sensor that includes a source and/or a detector. The NIR sensor performs a NIR measurement that is used to detect water content and/or oil content of the batch. Water content and/or oil content of the batch can also be detected using another field effect based system, such as (i) a microwave sensor that performs a microwave measurement, (ii) an infrared (IR) sensor that performs an IR measurement within or outside the NIR range, or (iii) other detection systems that can detect liquid content.

In further embodiments, the sensor 106(*a*), 106(*b*) is a pressure sensor that performs a pressure measurement and determines a pressure at a location along the extruder (e.g., a die pressure, a barrel pressure, and/or a pressure change at a mixing plate).

In various embodiments, the sensor 106(*a*), 106(*b*) is a temperature sensor that performs a temperature measurement (e.g., a ceramic pre-cursor batch temperature).

In yet further embodiments, the sensor 106(*a*), 106(*b*) is a pressure sensor that determines the shape of the extrudate as the extrudate is extruded from the die. For example, a laser can be used to scan around the surface of the extrudate. A change in length of the light path of the laser light can be used to determine a shape of the extrudate.

The sensor 106(*a*), 106(*b*) can send the rheology characteristic measured by the sensor to controller 108 using a signal (e.g., an electrical signal, fiber optic signal, or wireless signal). The controller 108 can perform a determination such as a calculation using the signal data from the sensor 106(*a*), 106(*b*). The calculation can be a comparison between the rheology characteristic and a predetermined rheology value (e.g., (i) a predetermined water content value of the batch (moisture), (ii) a predetermined oil (lubricant) content value of the batch, (iii) a predetermined shape of the extrudate, (iv) a predetermined extrusion torque value, (v) a predetermined temperature value of batch in the extruder, (vi) a predetermined pressure value of the batch in the extruder, (vii) a predetermined stiffness for the batch, and/or (viii) a predetermined wall drag value). The controller 108 can control an upstream or downstream process based on the determination using a control loop, such as a feedback control loop and/or a feedforward control loop. For example, illustrated system 100 includes a liquid regulator 110, such as a pump (e.g., a piston pump) or valve, to provide liquid, such as water and/or oil, from liquid tank 114 to the preconditioner 102. The controller 108 can determine based on the signal from the sensor 106(a) disposed at the metering pre-mix 104, that the batch in the metering pre-mix is too dry (e.g., detected water content is less than predetermined water content value) and control the pump 110 to add more water to the preconditioner 102. Likewise, the controller 108 can determine based on the signal from the sensor 106(a) that the batch in the metering pre-mix 104 is too wet (e.g., detected water content is greater than predetermined water content value) and control the pump 110 to add less water to the preconditioner 102.

In the case when the rheology characteristic (e.g., liquid content) is less than the predetermined rheology value, the controller 108 can generate a command with an increase liquid flow value and send it to the liquid regulator 110 to adjust liquid flow to the preconditioner 102. In response to receipt of the command with the increase liquid flow value, the liquid regulator 110 can then provide more liquid flow to the preconditioner 102.

In the case when the rheology characteristic (e.g., liquid content) is more than the predetermined rheology value, the controller 108 can generate a command with a decrease liquid flow value and send it to the liquid regulator 110 to adjust liquid flow to the preconditioner 102. In response to receipt of the command with the increase liquid flow value, the liquid regulator 110 provides less liquid flow to the precondition 102.

The batch from the metering pre-mix 104 moves into a crammer feeder 118 and is fed into a back end 120 (inlet end) of an extruder 122. The extruder 122 includes a barrel and extruder screw 124 to process the batch 126 added through the crammer feeder 118. The extruder 122 includes a drive unit 128 to drive the extruder screw 124 or extruder screws in the case of a twin screw extruder. The batch 126 is mixed and kneaded between screw flights 130 and the barrel inner wall 132. Screw flights 130 also pump the batch 126 downstream. The barrel can have barrel sections, such as a first barrel section 120, a second barrel section 136, a third barrel section 138, a fourth barrel section 142, etc., for example, up to nine or ten barrel sections. Alternatively, the barrel can have one barrel section the length of the extruder 122. The first barrel section 120 is provided with an input port 144 for introducing batch material to be mixed and plasticized into the extruder 122.

A mixer plate 146 can be positioned downstream of the screw section and contained within a cartridge 148 mounted on the outlet end of extruder 122. The mixer plate 146 further mixes and homogenizes the plasticized batch material 126. Also, a filter screen 154 and an extrusion die 158 can be disposed within the cartridge 148. The extrusion die 158 can be coupled with respect to the discharge port of the barrel such as at an end of the barrel. The extrusion die 158 can be preceded by other structure, such as a generally open cavity, a screen/homogenizer 154, or the like to facilitate the formation of a steady plug-type flow front before the batch reaches the extrusion die 158.

The extrusion die 158 can comprise a die body 160 that defines (i) feedholes 162 in an upstream surface 164 that extend downstream into the die body 160 to accept ceramic pre-cursor batch at the upstream surface 164 and (ii) exit slots 168 arranged in a matrix pattern intersecting the feedholes 162 in the die body 160 and that extend to a discharge surface 170 of the die to shape the ceramic pre-cursor batch into a honeycomb extrudate 172. The honeycomb extrudate 172 can exit the extruder 122 onto an air bearing 174. Further processing may include cutting, drying, and firing the extrudate 172 to form a ceramic honeycomb body.

In one embodiment, the sensor 106(a) has been described with respect to determining a rheology characteristic upstream of the extruder. Alternatively or additionally, the sensor 106(a) can also determine a rheology characteristic of the batch in the extruder barrel 132, at the mixer plate 146, at the extruder screen 154, at the extrusion die 158, and/or downstream of the extrusion die 158 as the extrudate 172 exits the extruder 122. For example, the rheology characteristic can be a liquid content of the ceramic pre-cursor batch, such as oil and/or water content, a stiffness of the ceramic pre-cursor batch, a temperature of the batch, a wall drag of the batch, a die pressure, a barrel pressure, a pressure change at the mixing plate, and/or a screen pressure.

Accordingly, the sensor can be disposed at various locations downstream of the metering pre-mix 104 as well as at the metering pre-mix 104. For example, in FIG. 1, the sensor 106(b) is also shown interrogating the extrudate 172 downstream of the die 158 to determine a rheology characteristic of the batch, such as moisture content (e.g., water) of the batch and/or organic liquid content (e.g., oil) of the batch. The sensor 106(b) can send the rheology characteristic to controller 108 using a signal. The controller 108 can perform a determination such as a calculation using the signal data from the sensor 106(b). The calculation can be a comparison between the rheology characteristic and a predetermined rheology value. The controller 108 can control an upstream process based on the determination in a feedback control loop.

For example, the controller 108 can determine based on the signal from the sensor 106(b) that the wall drag of the batch in the extrudate 172 is too high (e.g., detected wall drag is greater than a predetermined wall drag value) and control the pump 110 to add more oil (lubricant) to the preconditioner 102. Likewise, the controller 108 can determine based on the signal from the sensor 106(b) that the wall drag of the batch in the extrudate 172 is too low (e.g., detected wall drag is less than a predetermined wall drag value) and control the pump 110 to add less oil to the preconditioner 102. The controller 108 can send a signal, such as a command to the liquid regulator 110 to adjust oil flow to the batch 126 in the extruder 122.

In another example, the sensor 106(b) can be disposed and configured to determine pressure and temperature of batch in the extruder 122 at locations between the input port 144 and the die exit 170. Such measured pressures and temperatures can be used by the controller 108 in the feedback control loop to control liquid flow to the batch.

In yet another embodiment, the sensor 106(b) is configured to determine the shape of the extrudate as the extrudate is extruded from the die. If the shape of the extrudate does not conform to specifications (e.g., has an ellipsoidal shape that indicates the extrudate is too soft and cannot maintain its shape), then the controller 108 can send a signal to the liquid regulator 110 to add less water to the batch.

As illustrated in FIG. 1, the extruder 122 may further comprise a vacuum device 176 to evacuate gas 178, such as air from the ceramic pre-cursor batch. The vacuum device 176 can be a twin screw vent port stuffer and a vacuum pump. The vacuum device 176 can be disposed downstream of the inlet port 144 and upstream of the mixer plate 146 and cartridge 148. For example, when the inlet port 144 is disposed on a first barrel section 120, the vacuum device 176 can be disposed on a third barrel section 138.

Illustrative embodiments of the present disclosure may include one or more sensors 106(a), 106(b) at the preconditioner 102, the metering pre-mix 104, the extruder 122, and/or at the extrudate 172. In one embodiment, the extruder and upstream processing system 100 include only a single sensor, such as sensor 106(a) that is used to measure water content of the batch. In another embodiment, the extruder and upstream processing system 100 include two sensors, such as the sensor 106(a) that is used to measure water content of the batch and the sensor 106(b) that is used to measure wall drag and/or pressure for the batch. In this arrangement, the controller 108 can control water content using rheology characteristics provided from the sensor 106(a) and control lubricant content for the batch using rheology characteristics provided from the sensor 106(b). As used herein, the number 106 followed by letters in parentheticals, such as "106(a)," "106(b)," "106(c)," etc., indicates potential positions for sensors in the extruder and upstream processing system. Various embodiments of the system may not have sensors disposed in one or more potential positions or the system can have one or more sensors in each potential position. For example, in some embodiments, a single position can include a sensor that detects water content of the batch (e.g., a NIR sensor and/or a sensor that measures shape of the extrudate) and also a sensor that measures oil content of the batch (e.g., a NIR sensor, a pressure sensor, or a temperature sensor).

Figure 2:
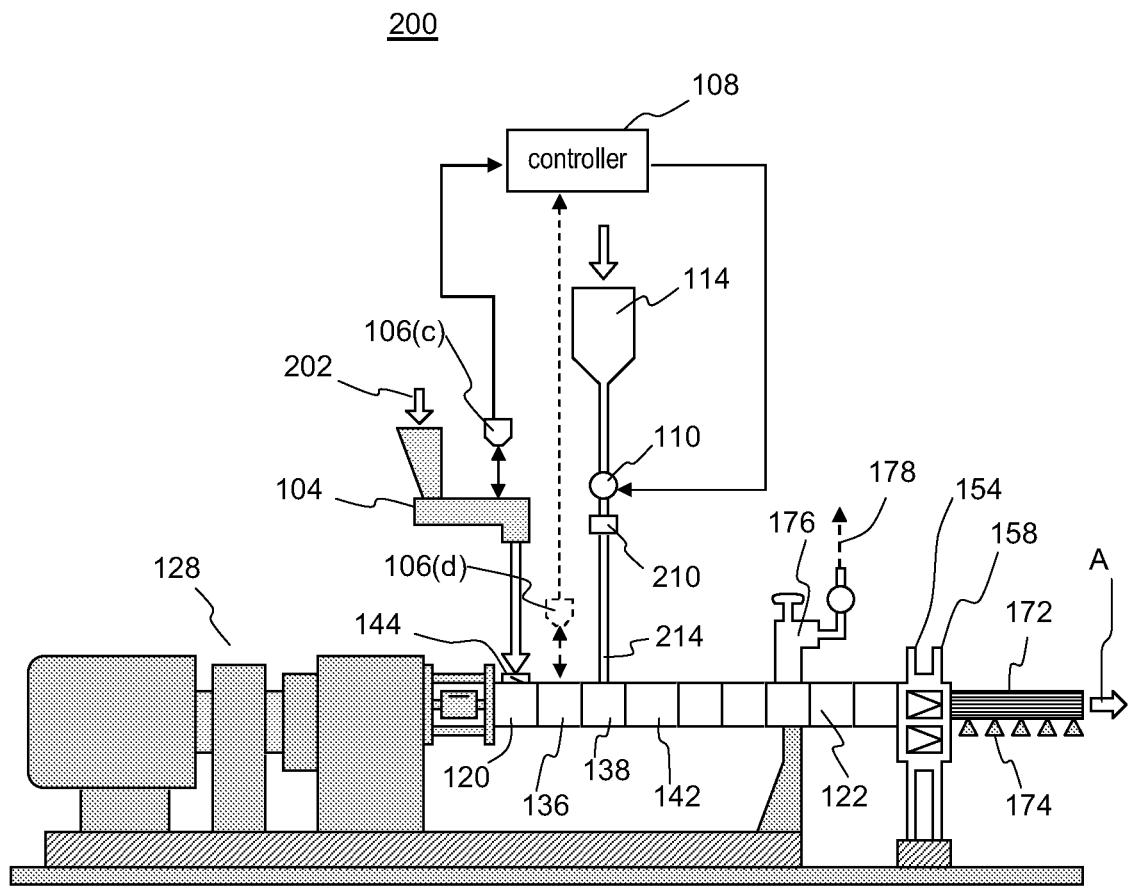
FIG. 2 shows another schematic of a screw extruder, such as a twin screw extruder, and upstream processing of batch components for extrudate such as honeycomb extrudate for ceramic honeycomb bodies for catalytic converter substrates and/or filters, according to exemplary embodiments of the disclosure.

FIG. 2 shows a schematic of a screw extruder, such as a twin screw extruder, and upstream processing of batch components for extrudate, such as honeycomb extrudate for ceramic honeycomb bodies for catalytic converter substrates and/or filters. As illustrated in FIG. 2, some components are the same as in FIG. 1 and some components are omitted for ease of description. For example, gravimetric metering pre-mix 202 feeds into metering pre-mix 104 and sensor 106(c), can determine the rheology characteristic of the ceramic pre-cursor batch as described above. In some of these embodiments, the inlet port 144 can be, for example, a gravity fed side feeder with a FET barrel incorporated to remove air and increase the bulk density of the powder for improved feeding efficiency.

According to exemplary embodiments, when the controller 108 determines that the rheology characteristic of the batch requires an adjustment, the controller 108 can control a downstream process based on the determination in a real time feedforward control loop. For example, illustrated system 200 includes a liquid regulator, such as a pump 110 (e.g., a piston pump) or valve, to provide liquid, such as water and/or oil, from liquid tank 114 directly to the batch 126 in the extruder 122. For example, the controller 108 can determine based on the signal from a sensor 106(c) disposed at the metering pre-mix 104 and/or a sensor 106(d) disposed at the extruder barrel 132 that the batch in the metering pre-mix is too dry (e.g., detected water content is less than predetermined water content value) and control the pump 110 to add more water to the batch 126 in the extruder 122.

Likewise, the controller 108 can determine based on the signal from the sensor 106(c), 106(d) that the batch in the metering pre-mix 104 is too wet (e.g., detected water content is greater than predetermined water content value) and control the pump 110 to add less water to the batch 126 in the extruder 122. The controller 108 can send a signal, such as a command, to the liquid regulator 110 to adjust liquid flow to the batch 126 in the extruder 122.

A liquid injection device 210 is provided according to some of these embodiments to inject fluid through a liquid injection port 214 into the batch 126 inside the extruder barrel 132. In some of these embodiments the liquid injection device 210 can be a piston pump or the like. The liquid injection device 210 can inject fluid into the batch 126 inside the extruder barrel 132 at a pressure between about 0.5 psi to about 3000 psi. For example, the liquid injection device 210 can inject fluid into the batch 126 inside the extruder barrel 132 at a pressure between about 0.5 psi to about 10 psi.

The injection port 214 can be disposed on a second barrel section 136 of the extruder 122 to add liquids to the ceramic pre-cursor batch 126 to provide uniform mixing, low wall drag, and adequate stiffness of the extrudate 172. The liquid can be introduced into the ceramic pre-cursor batch 126 during extrusion in, for example, the mixing/shearing zone of the extruder 122 and/or in the conveying zone of the extruder 122. The mixing/shearing zone of the extruder 122 can include neutral kneader blocks to replace shear discs at the end of the third barrel section 138 when the liquid injection port 214 is disposed on the second barrel section 136. The liquid injection port 214 can be a high pressure nozzle installed in a barrel pressure probe port. Water and tall oil can be injected through the same port having two lines that merge into one before entering the injection nozzle, according to some of these embodiments.

Figure 3:
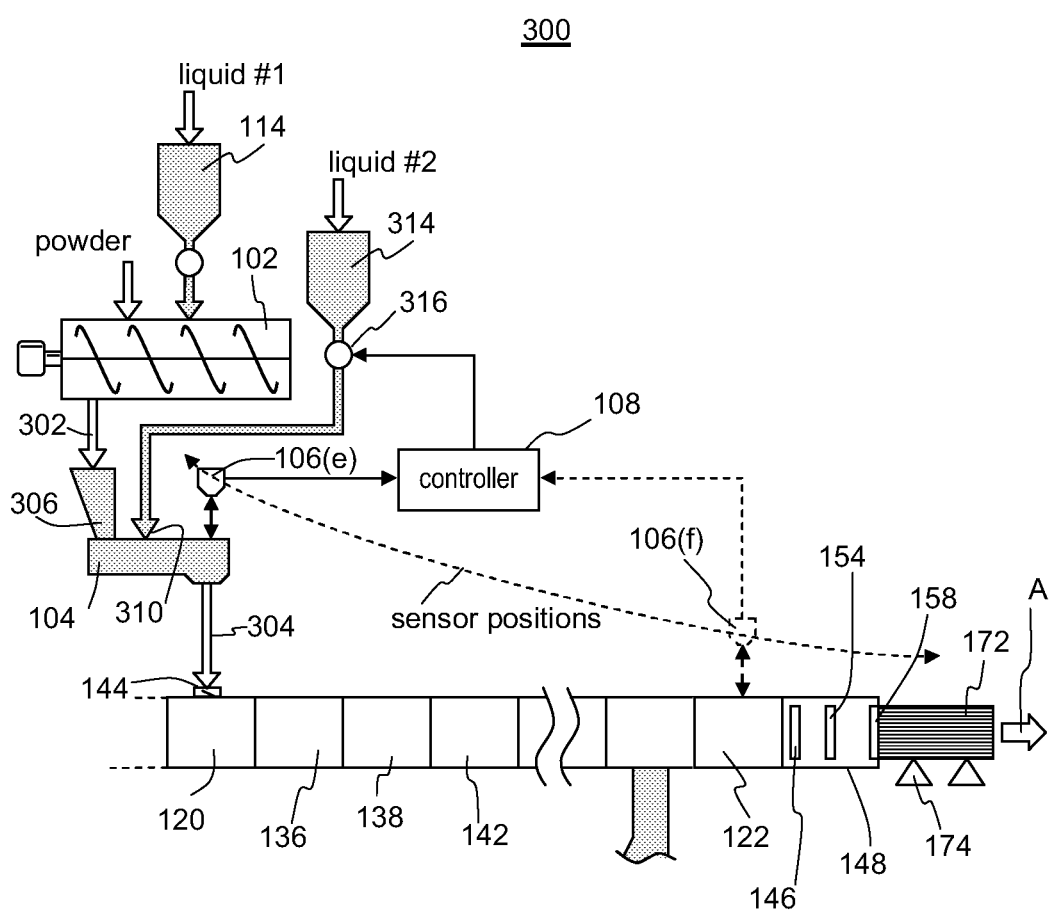
FIG. 3 shows another schematic of a screw extruder, such as a twin screw extruder, and upstream processing of batch components for extrudate such as honeycomb extrudate for ceramic honeycomb bodies for catalytic converter substrates and/or filters, according to exemplary embodiments of the disclosure.

FIG. 3 shows another schematic of a system 300 including a screw extruder, such as a twin screw extruder, and upstream processing of batch components for extrudate, such as honeycomb extrudate for ceramic honeycomb bodies for catalytic converter substrates and/or filters. As illustrated in FIG. 3, some components are the same as in FIG. 1 and some components are omitted for ease of description. In FIG. 3, a second liquid addition point 310 provides liquid, such as water and/or oil, to the batch after an initial quantity of liquid is added from liquid tank 114. In these exemplary embodiments 95% or less of the total batch liquid can be added to the batch by liquid tank 114. For example, 90% or less of the total batch liquid can be added to the batch by liquid tank 114, 85% or less of the total batch liquid can be added to the batch by liquid tank 114, or even 80% or less of the total batch liquid can be added to the batch by liquid tank 114. The remainder portion to reach 100% of the total batch liquid can be added to the batch at the second liquid addition point 310 by the second liquid tank 314. For example, the remainder portion to reach 100% of the total batch liquid added to the batch at the second liquid addition point 310 by the second liquid tank 314 can be 5% of the total batch liquid, 10% of the total batch liquid, 15% of the total batch liquid, or even 20% of the total batch liquid. The remainder portion can then be adjusted to provide control of the batch rheology.

The feedback control, as described above with reference to FIG. 3, can provide control of batch liquid content, and thus batch rheology, using a sensor 106(e), 106(f), the controller 108, and the second liquid addition point 310. For example, illustrated system 300 includes a liquid regulator 316, such as a pump (e.g., a piston pump) or valve, to provide liquid, such as water and/or oil, from liquid tank 314 to the metering pre-mix 104. The controller 108 can determine based on the signal from the sensor 106(e) that the batch in the metering pre-mix 104, or the batch at some other location where sensor 106(f) is disposed along the extruder 122 from the metering pre-mix 104 to the extrudate 172, is too dry (e.g., detected water content is less than predetermined water content value) and control the pump 110 to add more water to the metering pre-mix 104. Likewise, the controller 108 can determine based on the signal from the sensor 106(e), 106(f) that the batch in the metering pre-mix 104, or other location as described above, is too wet (e.g., detected water content is greater than predetermined water content value) and control the pump 110 to add less water to the metering pre-mix 104. The controller 108 can send a signal, such as a command, to the liquid regulator 316 to adjust liquid flow to the metering pre-mix 104.

While the second liquid addition 310 is shown in the metering pre-mix 104 in FIG. 3, the disclosure is not so limited and the second liquid addition can also be disposed and configured to inject directly into the extruder barrel 132 as described with reference to FIG. 2, while maintaining the sensor 106(e), 106(f) downstream of the second liquid addition 310 to provide the described feedback control.

Figure 4:
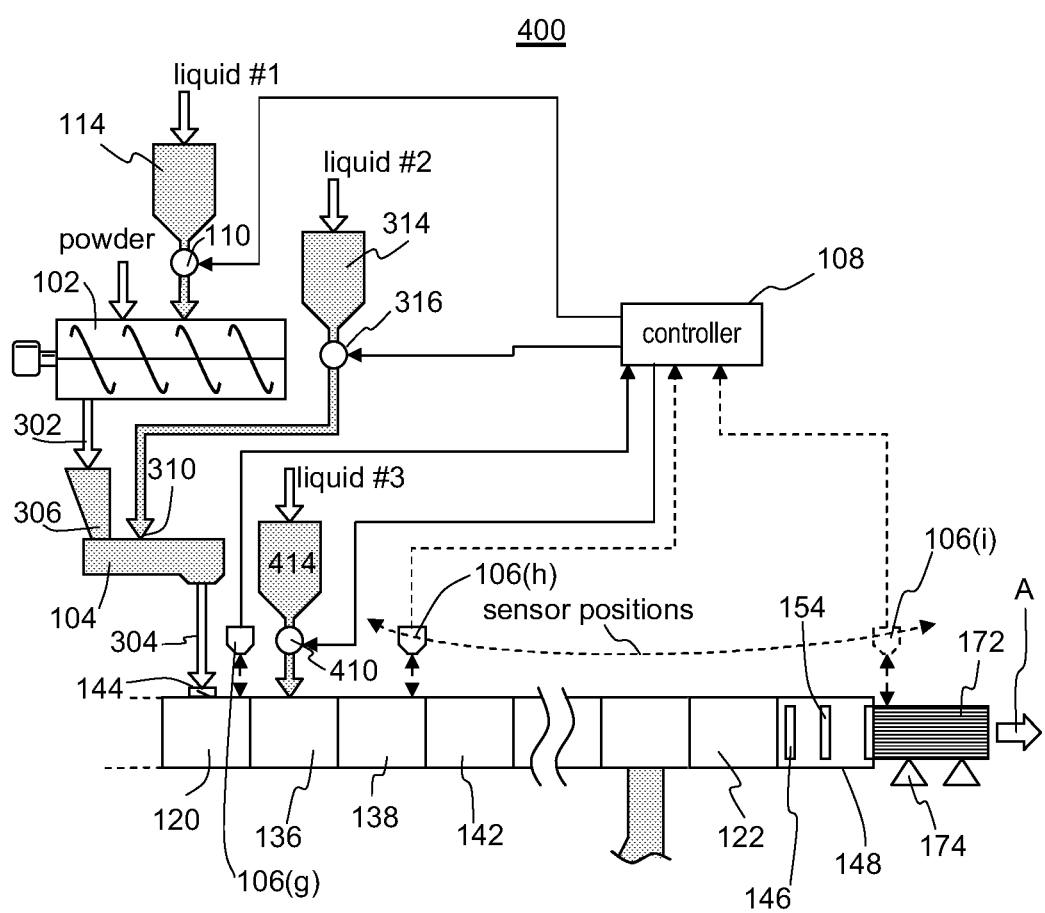
FIG. 4 shows another schematic of a screw extruder, such as a twin screw extruder, and upstream processing of batch components for extrudate such as honeycomb extrudate for ceramic honeycomb bodies for catalytic converter substrates and/or filters, according to exemplary embodiments of the disclosure.

FIG. 4 shows another schematic of a screw extruder system 400 such as a twin screw extruder, and upstream processing of batch components for extrudate, such as honeycomb extrudate for ceramic honeycomb bodies for catalytic converter substrates and/or filters. FIG. 4 shows a feedback control system 400, similar to FIGS. 1 and 3, however, the controller 108 (i) can send a signal, such as a command, to the liquid regulator 110 to adjust liquid flow to the preconditioner 102, (ii) can send a signal, such as a command, to the liquid regulator 316 to adjust liquid flow to the metering pre-mix, and/or (iii) can send a signal, such as a command, to a third liquid regulator 410 to adjust liquid flow from a third liquid tank 414 directly into the extruder barrel 132 based on a rheology characteristic provided from the sensor 106(g), 106(h), 106(i).

In some of these embodiments the sensor 106(g) can be disposed to sense the rheology characteristic of the batch downstream of the second liquid tank 314, but upstream of a subsequent liquid tank 414, send the rheology characteristic to the controller 108, and the controller 108 can control the second liquid regulator 316 to provide liquid, such as water and/or oil, from liquid tank 314 to the process in a feedback loop. Simultaneously, the controller 108 can control the third liquid regulator 410 to provide liquid, such as water and/or oil, from third liquid tank 414 to the process in a feedforward loop. Likewise, when the sensor 106(g) is disposed between the first and second liquid tanks 114, 314, the controller 108 can provide feedback control through the first liquid regulator 110 and feedforward control through the second liquid regulator 316 and/or the third liquid regulator 410. Furthermore, in some embodiments, the sensor 106(h), 106(i) can be disposed to sense the rheology characteristic of the batch downstream of the third liquid tank 414, such as at the third barrel section 138, the fourth barrel section 142, the mixer plate 146, the extruder screen 154, and/or at the extrudate 172. The controller 108 can provide feedback control through the first liquid regulator 110, the second liquid regulator 310, and/or the third liquid regulator 510 using rheology characteristics obtained by the sensor 106(h), 106(i) downstream of the third liquid tank 414.

Figure 5:
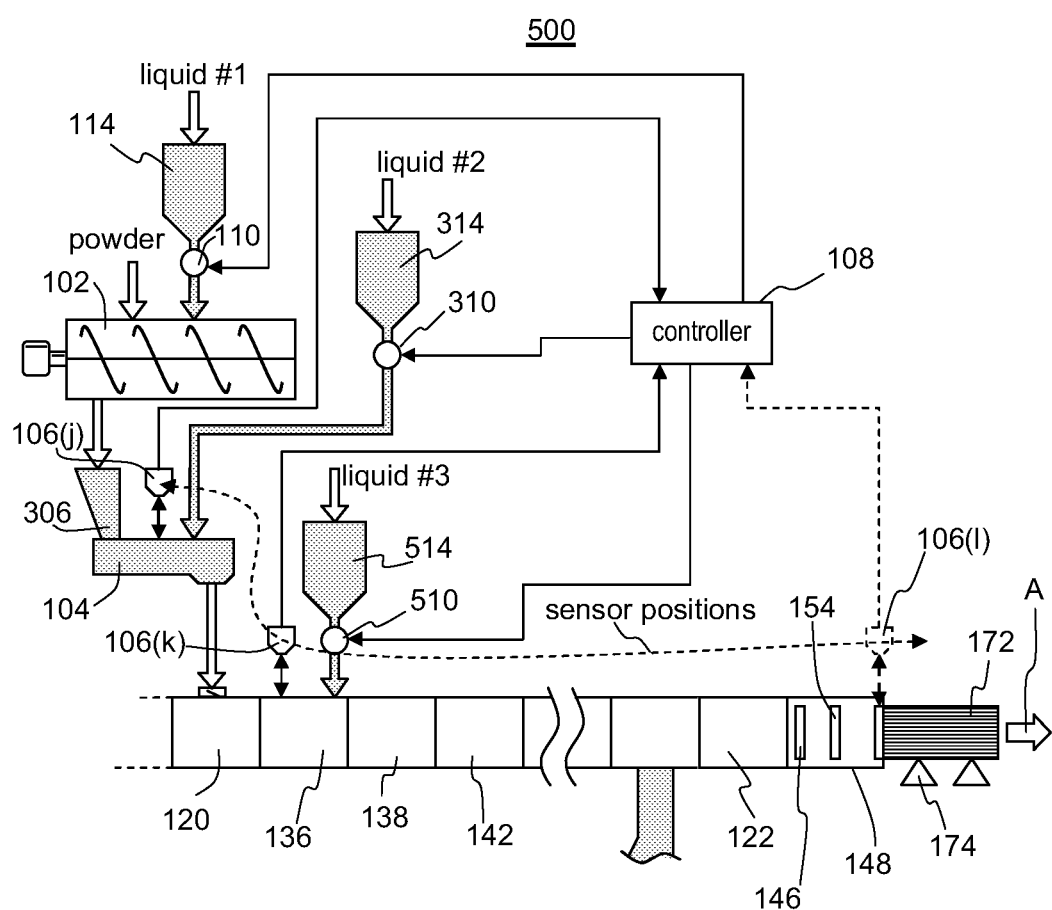
FIG. 5 shows another schematic of a screw extruder, such as a twin screw extruder, and upstream processing of batch components for extrudate such as honeycomb extrudate for ceramic honeycomb bodies for catalytic converter substrates and/or filters, according to exemplary embodiments of the disclosure.

FIG. 5 shows another schematic of a screw extruder system 500, such as a twin screw extruder, and upstream processing of batch components for extrudate, such as honeycomb extrudate for ceramic honeycomb bodies for catalytic converter substrates and/or filters. In some of these embodiments, the sensor 106(j) can be disposed to sense the rheology characteristic of the batch upstream of the second liquid tank 314, send the rheology characteristic to the controller 108 and the controller 108 can control the second liquid regulator 310 to provide liquid, such as water and/or oil, from liquid tank 314 to the process in a feedforward loop. The sensor 106(j), 106(k) can be disposed to sense the rheology characteristic of the batch upstream of the third liquid tank 514, send the rheology characteristic to the controller 108, and the controller 108 can control the third liquid regulator 510 to provide liquid, such as water and/or oil, from the third liquid tank 514 to the process in a feedforward loop. Likewise, when the sensor 106(k) is disposed between the second and third liquid tanks 314, 514, the controller 108 can provide feedback control through the second liquid regulator 310 and feedforward control through the third liquid regulator 510. Furthermore, in some embodiments, the sensor 106(l) can be disposed to sense the rheology characteristic of the batch downstream of the third liquid tank 514, such as at the third barrel section 138, the fourth barrel section 142, mixer plate 146, the extruder screen 154, and/or at the extrudate 172. The controller 108 can provide feedback loop control through the first liquid regulator 110, the second liquid regulator 310, and/or the third liquid regulator 510 using rheology characteristics obtained by the sensor 106(l) downstream of the third liquid tank 414.

Figure 6:
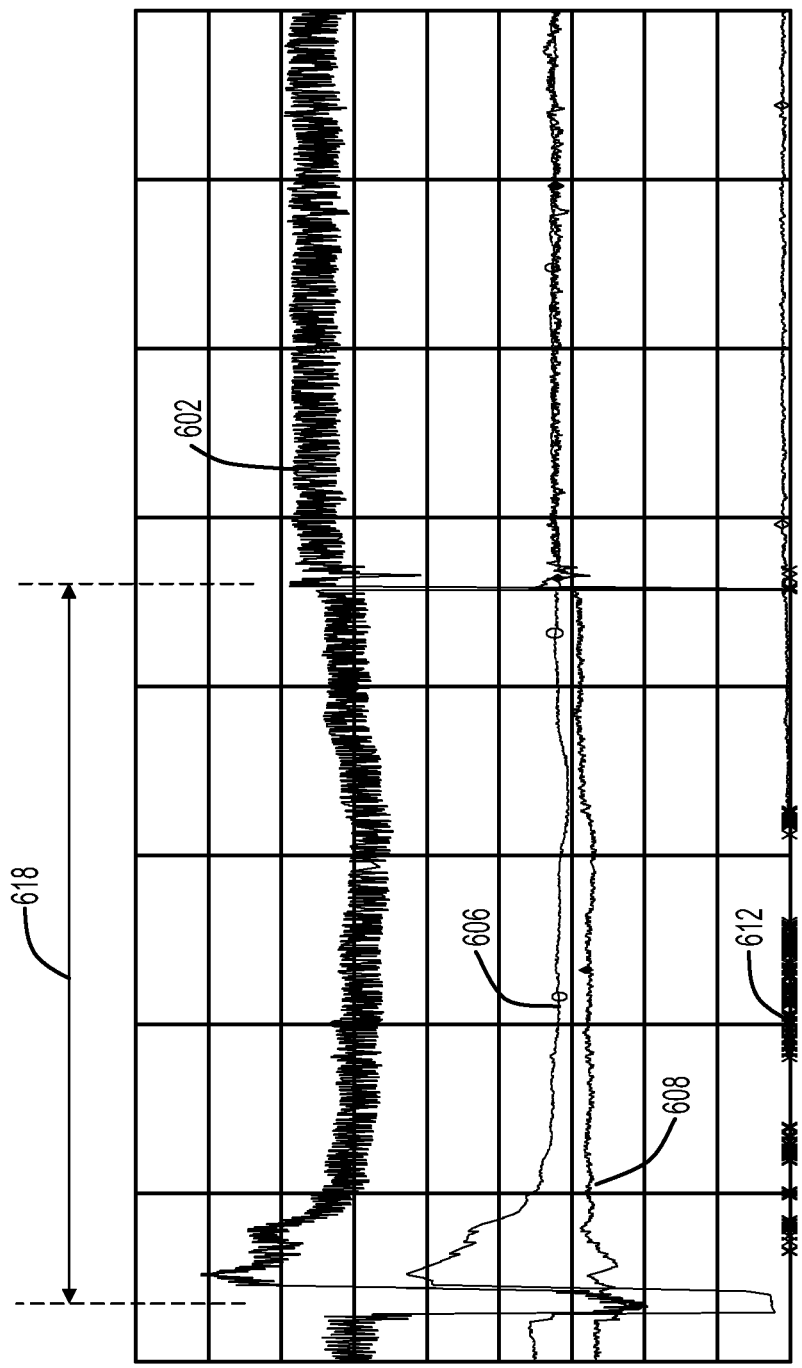
FIG. 6 presents a graphical data plot of extruder pressures versus time for a clean die startup for thin-wall (TW) honeycomb extrudate having 400 cells per square inch (62 cells per square cm) and a 4 mil wall thickness (0.1 mm).

FIG. 6 presents a graphical data plot of extruder pressures versus time for a clean die startup for thin-wall (TW) honeycomb extrudate having 400 cells per square inch (62 cells per square cm) and a 4 mil wall thickness (0.1 mm). FIG. 6 shows that it may take 2 hours (618) before batch water reaches an acceptable content to extrude good ware. Initial die pressure transient time is 30 minutes. The maximum pressure is indicated by line 602, the die pressure is indicated by line 606, the screen pressure is indicated by line 608, and the homogenizer pressure is indicated by line 612.

During start-up of a new extruder die or a clean extruder die, high pressures may be required and production yields may be low until die pressure stabilizes to a steady state running pressure. For die pressure start up time reduction, liquid can be added, for example, water with surfactants and/or lubricants. In some embodiments, a predetermined amount of liquid can be added over a predetermined time period to send a charge of batch through the clean die to allow for minimum start up time. In such embodiments, the predetermined rheology value can call for the predetermined amount of liquid that is greater than an amount of liquid during steady state running. In some of these embodiments, the throughput of the extruder 122 can remain constant because the extrusion die pressure remains below a shutoff pressure. This constant throughput may not be possible without the injection of the predetermined amount of liquid. Once the extrusion die pressure is back to a stable level the extrudate can then be processed through the line.

As briefly described above, the liquid injection port 214 can reduce liquid variability in the ceramic pre-cursor batch 126 according to some of these exemplary embodiments. As described, liquid stability can be performed by measuring the liquid content in the batch with the sensor 106. The feedback or feedforward loop between the liquid injection port 214 and the sensor 106 can inject a specified amount of liquid to the batch where the sensor 106 detects lower content of liquid or higher content of liquid to hit a target amount of liquid in the batch. Decreasing liquid variability of the batch improves process stability including pressure and temperature stability, and results in extruded product uniformity.

Figure 7:
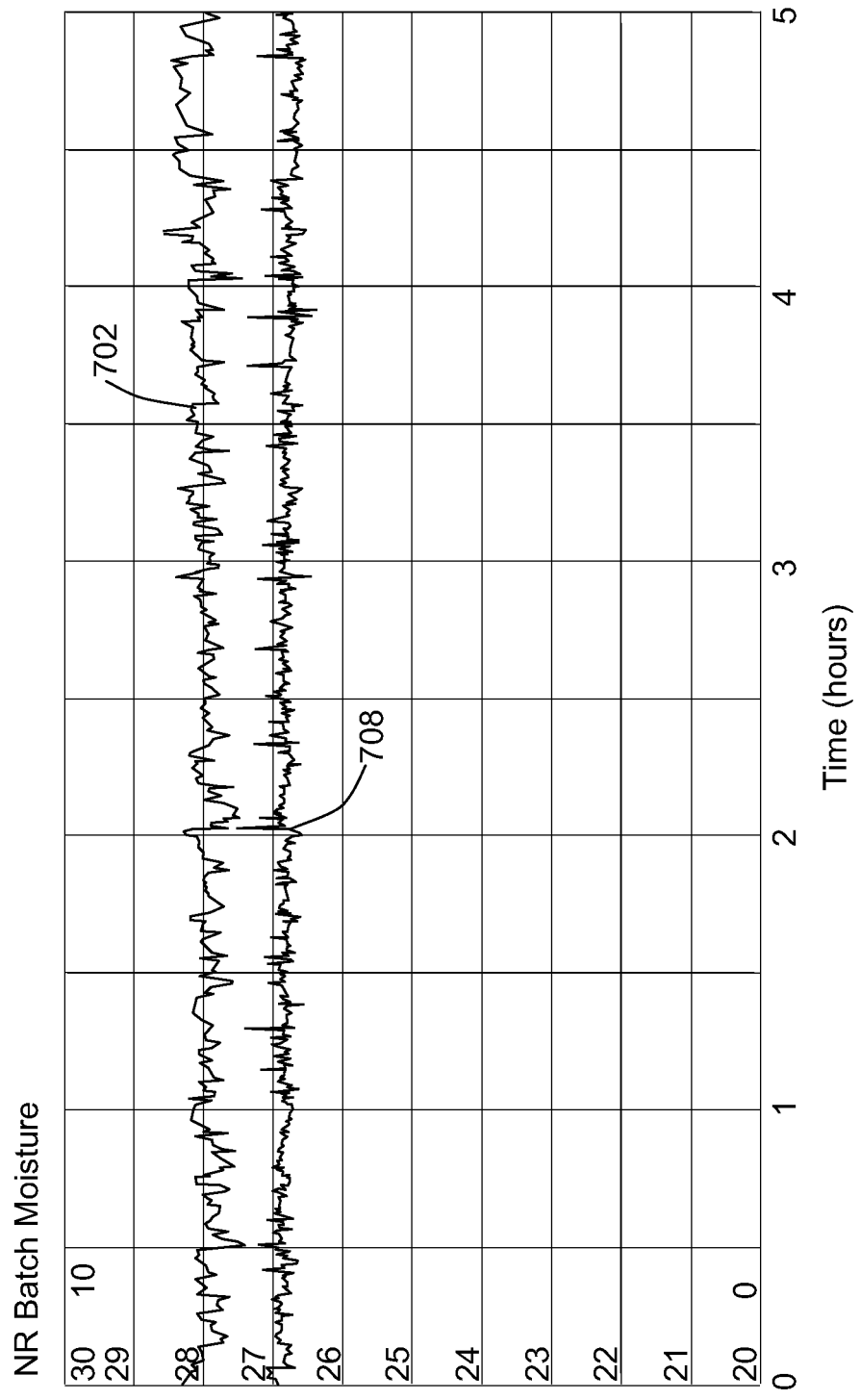
FIG. 7 shows a graphical plot of weight percentage versus time for data obtained from Near-Infrared (NIR) readings from a ceramic forming batch showing variability over time.

FIG. 7 shows a graphical plot of weight percentage versus time for data obtained from Near-Infrared (NIR) readings from a ceramic forming batch showing variability over time. Line 702 indicates the ceramic pre-cursor batch moisture on the scale from 20% to 30% in the metering pre-mix 104 and line 708 indicates oil content on the scale from 0% to 10% in the metering pre-mix 104. Such data can be used in the feedback and feedforward control loops with the liquid injection port 214 to reduce batch liquid variability according to exemplary embodiments of the disclosure.

In some of these exemplary embodiments, near line rheology characterization tools at pressure ports of the extruder 122 can be used to tune the rheology of the ceramic pre-cursor batch to achieve desired rheological properties delivered to the extrusion die 158. In such a case, the liquid can be adjusted to the optimum content for both stiffness and walldrag. For example, the preconditioner 102, such as a Littleford® mixer can inject 90% of the liquids and the liquid injection port 214 can inject the final 10% of each liquid for the ceramic pre-cursor batch. For example, if the walldrag is slightly higher than nominal, an increase in tall oil or stearic acid emulsion can be injected to reduce the walldrag, or, if the walldrag is slightly lower than nominal, a decrease in tall oil or stearic acid emulsion can be injected to increase the walldrag. For example, for stiffness adjustments, the total amount of water can be adjusted immediately upon receiving feedback to achieve the optimum water content and batch stiffness. This reduces the time to change water in the batch to less than 10 minutes, from about 20-40 minutes, to achieve the optimized water content. Such a reduction in the time to change water in the batch dramatically improves manufacturing efficiency and reduces material utilization losses due to defects in the honeycomb body extrudate, such as swollen webs, fast flow webs, collapse, and misshapen extrudate.

Furthermore, the feedback and feedforward rheology control can provide a constant extrusion die pressure according to some of these embodiments. For example, while inorganics in a batch may vary, a rheology of the batch can be detected by the sensor 106 at the extrusion die 158. In such a case, the controller 108 can compare the rheology characteristic to a predetermined rheology value and control the liquid regulator, such as liquid injection port 214 and/or regulator 110, to modify the liquid content of the batch to maintain a constant die extrusion pressure. That is, in some embodiments to achieve stable extrusion pressures, it is not enough to have a constant liquid content target when the inorganic batch component, such as particle size, particle size distribution, or other change in raw materials changes. Instead, the target liquid content changes to meet the predetermined rheology value as incoming variables change. Thus, in some of these embodiments, the change in rheology characteristic, in the ceramic precursor batch can be measured by the sensor 106 based on extrusion die pressure and/or other extrusion pressures, such as barrel pressure, mixer plate 146 pressure change, screen pressure, etc., and combinations thereof.

Some embodiments of the disclosure can significantly reduce startup time of new dies and clean dies, resulting in efficient production of extrudate, for example, due to reduced purge losses. Some embodiments of the disclosure can enable coarse and fine control for water and/or other liquid addition to the batch in the extruder, thereby reducing the time between (i) when a change in liquid content is determined and (ii) when the change in water content impacts on forming processes. Also, some embodiments of the present disclosure can reduce forming process variability due to more continuous, dynamic, and real-time water and/or other liquid adjustments (in comparison to batch adjustments in the upstream mixer). Furthermore, some embodiments of the present disclosure facilitate disassembly and cleaning during extruder rebuilds. Further, some embodiments of the disclosure can be used to control temperature and water loss due to process vacuum in the extruder, thereby significantly reducing the time that non-conforming batch is extruded.

Some of the methods and processes described herein, such as (i) receiving a rheology characteristic from a sensor, (ii) comparing the rheology characteristic to a predetermined rheology value of the ceramic pre-cursor batch, and (iii) generating a command based on the comparison, can be performed by the controller.

The term "controller" should not be construed to limit the embodiments disclosed herein to any particular device type or system. In one embodiment, the controller includes a computer system. The computer system may be a laptop computer, a desktop computer, or a mainframe computer. The computer system may include a graphical user interface (GUI) so that a user can interact with the computer system. The computer system may also include a computer processor (e.g., a microprocessor, microcontroller, digital signal processor, or general purpose computer) for executing any of the methods and processes described above (e.g., processes i-iii listed above).

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. This memory may be used to store, for example, rheology characteristics of the ceramic pre-cursor batch and predetermined rheology values of the ceramic pre-cursor batch.

Some of the methods and processes described above, including processes i-iii, as listed above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Additionally or alternatively, the controller may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

It will be understood that for the purposes of this disclosure, "at least one of X, Y, and Z" can be construed as X only, Y only, Z only, or any combination of two or more items X, Y, and Z (e.g., XYZ, XYY, YZ, ZZ). Furthermore, it will be understood that for the purposes of this disclosure, "X, Y, and/or Z" can be construed as X only, Y only, Z only, or any combination of two or more items X, Y, and Z (e.g., XYZ, XYY, YZ, ZZ).

Reference throughout this specification to exemplary embodiments and similar language throughout this specification may, but do not necessarily, refer to the same embodiment. Furthermore, the described features, structures, or characteristics of the subject matter described herein with reference to an exemplary embodiment may be combined in any suitable manner in one or more exemplary embodiments.

The methods described above are generally set forth as logical flow. As such, the order and steps are indicative of representative embodiments. Other steps and methods may be conceived that are equivalent in function, logic, or effect to one or more steps, or portions thereof, of the methods. Additionally, the order in which a particular method occurs may or may not strictly adhere to the order of the corresponding steps as described herein.

It will be apparent to those skilled in the art that various modifications and variations can be made in the present disclosure without departing from the spirit or scope of the disclosure. Thus, it is intended that the appended claims cover the modifications and variations of this disclosure provided they come within the scope of the appended claims and their equivalents.

The invention claimed is:

1. An extrusion system, comprising:
an extruder, comprising:
an input port configured to feed ceramic pre-cursor batch into a first section of an extruder barrel, and
a discharge port configured to extrude a ceramic pre-cursor extrudate out of the extruder barrel downstream of the input port;
a first liquid injector configured to inject liquid into the ceramic pre-cursor batch upstream of the extruder;
a second liquid injector configured to inject liquid into the ceramic pre-cursor batch within the extruder;
a sensor configured to detect a rheology characteristic of the ceramic pre-cursor batch;
a controller configured (i) to receive the rheology characteristic from the sensor, (ii) compare the rheology characteristic to a predetermined rheology value of the ceramic pre-cursor batch, and (iii) generate a command based on the comparison; and
a liquid regulator configured to receive the command and adjust liquid flow to the first liquid injector and the second liquid injector based on the command.

2. The system of claim 1, wherein the rheology characteristic comprises at least one of (i) a liquid content of the ceramic pre-cursor batch, (ii) a stiffness of the ceramic pre-cursor batch, (iii) a wall drag of the ceramic pre-cursor batch, (iv) a die pressure, (v) a barrel pressure, (vi) a pressure change at a mixing plate, (vii) an extrusion torque, (viii) a ceramic pre-cursor batch temperature, and (ix) a screen pressure.

3. The system claim 1, wherein the predetermined rheology value comprises (i) a first liquid value for extruder die start-up conditions and (ii) a second liquid value less than the first value for steady-state extruder conditions.

4. The system of claim 1, wherein the first liquid injector is configured to inject liquid into the ceramic pre-cursor batch upstream of the first section of the extruder barrel.

5. The system of claim 1, wherein the second liquid injector is configured to inject liquid into the ceramic pre-cursor batch in a second section of the extruder barrel downstream of the first section of the extruder barrel and upstream of the discharge port of the extruder barrel.

6. The system of claim 1, wherein the first liquid injector and/or the second liquid injector are configured to inject liquid into the extruder barrel at a pressure of 0.5 psi to 10 psi.

7. The system of claim 1, wherein the sensor is configured to detect the liquid content in the ceramic pre-cursor batch upstream of the input port.

8. The system of claim 1, wherein the sensor is configured to detect the liquid content in the ceramic pre-cursor batch downstream of the discharge port.

9. The system of claim 1, wherein the sensor is configured to detect at least one of oil-based fluid content and water-based fluid content as the liquid content in the ceramic pre-cursor batch.

10. The system of claim 1, further comprising a die coupled to the discharge port, the die comprising:
a die body;
feed holes configured to accept the ceramic pre-cursor batch at the upstream surface, wherein the feedholes are disposed in an upstream surface of the die body and extend downstream into the die body; and
exit slots configured to shape the ceramic pre-cursor batch into a honeycomb extrudate, wherein the exits slots are arranged in a matrix pattern intersecting the feedholes in the die body and extend to a discharge surface of the die.

11. The system of claim 1, wherein the controller is configured to (i) generate the command with an increase liquid flow value, when the rheology characteristic is less than the predetermined rheology value, and (ii) generate the command with a decrease liquid flow value when the rheology characteristic is more than the predetermined rheology value, and
wherein the liquid regulator is configured to adjust more liquid flow to the first liquid injector or the second liquid injector in response to receipt of the command with the increase liquid flow value, and
wherein the liquid regulator is configured to adjust less liquid flow to the first liquid injector or the second liquid injector in response to receipt of the command with the decrease liquid flow value.

12. The system of claim 1, further comprising a vacuum device configured to evacuate gas from the ceramic pre-cursor batch in a third section of the extruder barrel downstream of the input port, downstream of the second liquid injector, and upstream of the discharge port.

13. A method of manufacturing a ceramic pre-cursor extrudate, the method comprising:
disposing a ceramic pre-cursor batch into a first section of an extruder barrel;
injecting liquid into the ceramic pre-cursor batch via a first liquid injector and a second liquid injector;
extruding a ceramic pre-cursor extrudate out of the extruder barrel downstream of the disposing and the injecting;
detecting a rheology characteristic of the ceramic pre-cursor batch;
comparing the rheology characteristic to a predetermined rheology value of the ceramic pre-cursor batch; and adjusting an amount of liquid injected into the ceramic pre-cursor batch based on the comparing.

14. The method of claim 13, wherein the predetermined rheology value comprises (i) a first liquid value for extruder die start-up conditions and (ii) a second liquid value less than the first value for steady-state extruder conditions.

15. The method of claim 13, wherein the predetermined rheology value is at least one of (i) a die pressure, (ii) a barrel pressure, (iii) a pressure change at the mixing plate, (iv) a screen pressure, and (v) a ceramic pre-cursor batch temperature.

16. The method of claim 13, wherein the injecting is upstream of the first section.

17. The method of claim 13, wherein the injecting is in a second section of the extruder barrel downstream of the first section.

18. The method of claim 13, wherein the detecting comprises detecting the rheology characteristic in the ceramic pre-cursor batch upstream of the injecting.

19. The method of claim 13, wherein the detecting comprises detecting the rheology characteristic in the ceramic pre-cursor batch downstream of the extruding.

20. The method of claim 13, wherein the extruding comprises forming a honeycomb extrudate.

* * * * *